INVENTOR.
RICHARD L. JACKSON

ATTORNEY

United States Patent Office 3,719,655
Patented Mar. 6, 1973

3,719,655
PROCESS FOR THE CRYSTALLIZATION OF THE AMMONIUM AND ALKALI METAL SALTS IN INSULIN
Richard Lee Jackson, Indianapolis, Ind., assignor to Eli Lilly and Company, Indianapolis, Ind.
Filed Dec. 5, 1969, Ser. No. 882,563
Int. Cl. A61k *17/04;* C07a *7/00;* C07c *103/52*
U.S. Cl. 260—112.7                           7 Claims

ABSTRACT OF THE DISCLOSURE

Insulin is isolated and purified from an insulin-containing solution by the adjustment of the basicity to about pH 7.2–10.0 and the alkali metal ion or ammonium ion concentration to about 0.2 M to 1.0 M, thereby causing crystallization of the alkali metal or ammonium salt of insulin. The method upgrades insulin from about 2 International Units (I.U.) per milligram to about 22–26 I.U. per milligram while recovering 90–95 percent of the insulin from an aqueous-acid pancreatic extract.

BACKGROUND OF THE INVENTION

Figure 1:
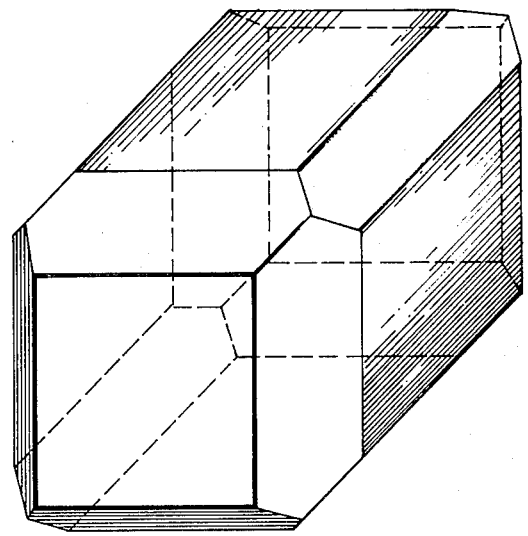

Since the discovery of insulin in 1921 as a component of the pancreas, a considerable amount of effort has been expended in developing methods for purifying insulin. Banting, Best, and Collip, in their first patent on the method of preparing insulin, U.S. 1,469,994, disclosed a purification process which comprises precipitating the contaminants contained in an aqueous extract of pancreas at their iso-electric point. The insulin remains in the extract after removal of the precipitates.

Walden, in U.S. Pat. 1,520,673, disclosed the iso-electric precipitation of insulin from an aqueous pancreatic extract at about pH 4 to about pH 7, preferably between pH 4.5 and pH 5.5, a method which is still used commercially in the purification of insulin.

Kharasch, in U.S. Pat. 1,866,569, disclosed a process for purifying insulin which comprises treating a substantially anhydrous insulin-containing material with anhydrous ammonia, filtering the solution thus obtained from the insoluble residue, and evaporating the ammonia from the filtrate to yield a white amorphous insulin product.

Murlin, in U.S. Pat. 1,547,515, disclosed the first process for salting insulin out of an extraction solvent by the addition of sodium chloride.

Lautenschläger and Lindner, in U.S. Pat. 2,449,076, described a differential salting out process for insulin purification. The method comprises salting out insulin from a neutralized extract by the addition of sodium chloride, filtering, redissolving the residue, and again salting out the insulin utilizing a lower sodium chloride concentration. The suggested concentrations of sodium chloride were between 25 and 15 percent by weight.

Grant, in U.S. Pat. 2,529,152, disclosed a method for separating fats from insulin by partially evaporating the alcohol from an aqueous insulin-containing acid-alcohol extract and separating the fat fraction which is insoluble in the resulting mixture.

Waugh, in U.S. Pat. 2,648,622, taught the precipitation of insulin in the form of clumped fibrils. Previously isolated fibrils were used to seed aqueous solutions containing insulin in order to precipitate the insulin therefrom. The insulin fibrils were isolated by filtration or centrifugation.

Homan, in U.S. Pat. 2,663,666, disclosed a method of insulin purification comprising sequentially adjusting the acidity of an aqueous pancreatic extract to pH 4.0–5.5, pH 7.0–8.5, and pH 3.0–3.5; filtering the resulting mixture after each adjustment and discarding the residue, consisting of the undesired acidic and basic components of the extract, from each filtration. The insulin is then recovered from the final filtrate.

Peterson, in U.S. Pat. 2,636,228, claimed the precipitation of zinc-insulin from a citric acid-citrate buffer as a means of separating insulin from a glycogenolytic factor.

Jorpes et al., in U.S. Pat. 2,878,159, disclosed a method for the purification of insulin which comprises passing an aqueous pancreatic extract over a carboxylic acid type cation-exchange resin.. Volini et al., in U.S. Pat. 3,069,323, disclosed the use of an aminocellulose anion-exchange resin in a similar process.

Present commercial processes for the purification of insulin can comprise at least three of the above procedures, and include, typically, one or more salt precipitations at differing salt concentration, one or more iso-electric precipitations, and at least one zinc crystallization.

Crystalline forms of insulin have been disclosed by many workers, as for example, Abel, Proc. Nat. Acad. Sci. 12, 132 (1926); Biochem. J. 28, 1592–1602 (1934); and 29, 1048–1054 (1935); Scott, U.S. Pat. 2,143,590; Harrington and Scott, Biochem. J. 23, 384 (1929); and Schlichtkrull, U.S. Pats. 2,819,999 and 2,836,542, among others. A review was published in 1958 by Schlichtkrull, "Insulin Crystals," Ejnar Munksgaard Publishers, Cophenhagen, Denmark, 1958. The publications of these and other authors suggest that insulin forms crystals only in the presence of certain bivalent cations, of which zinc, cobalt, cadmium, nickel, copper, iron, and manganese have been specifically identified. However, Schlichtkrull, in "Insulin Crystals," loc. cit., at page 55, described insulin crystals of unknown composition which existed as rhombic dodecahedrons and described their preparation as follows:

"A sterile solution was prepared containing: 0.17% recrystallized pig insulin (made zinc free by the salting-out procedure), 0.01 M sodium acetate, 0.7% NaCl, 0.1% methylparahydroxybenzoate, and having pH=7.0. The solution was filled into 10 ml. vials and stored at 4° C. After 3 months it was found that ⅔ of the insulin was precipitated on the glass walls as 10–50$\mu$ rhombic dodecahedral crystals with no birefringence."

SUMMARY OF THE INVENTION

This invention pertains to a method for the isolation and purification of insulin.

More particularly, this invention relates to a method for obtaining, in good yield, the crystalline rhombic dodecahedrons of insulin described by Schilchtkrull.

Still further, this invention relates to a method for obtaining unique octadecahedral crystals of insulin.

The method of this invention comprises adjusting the basicity of an insulin-containing solution to about pH 7.2 to about pH 10.0 with an alkali metal or ammonium base and the alkali metal or ammonium cation concentration of the solution to about 0.2 M to about 1.0 M, whereupon an alkali metal or ammonium insulin crystallizes in high yield and can be removed by filtration, decantation, or centrifugation. The salt crystallizes in the octadecahedral or dodecahedral crystal form and is water soluble. The crystal form isolated is influenced by the concentration of insulin and the basicity of the mother liquor and upon the age of the crystals prior to separation.

About 1 cation per insulin molecule is incorporated in the crystal structure. The crystalline material can be used without further purification to manufacture commercial zinc-insulin preparations.

Figure 2:
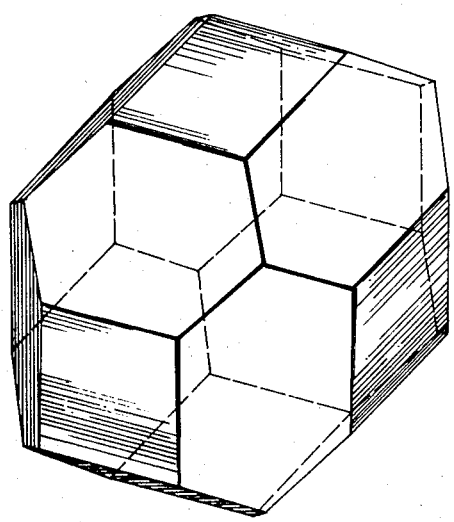
Figure 3:
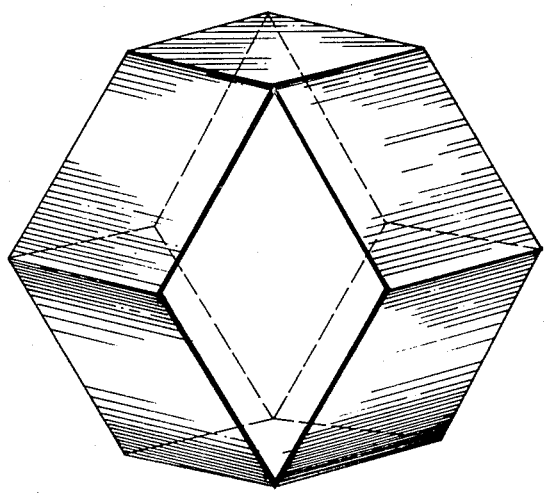

The crystals appear to be of the isometric or cubic system in which the 12 edges of a cube have become truncated during crystal growth. FIG. 1 illustrates the crystals obtained when truncation has occurred to a minimum extent. FIG. 2 illustrates crystals with more extensive truncation. FIG. 3 illustrates crystals in which the original cube faces have disappeared during the crystallization process. The crystals depicted in FIG. 3 appear to be identical to the crystals of unknown composition described by Schlichtkrull, loc. cit.

DETAILED DESCRIPTION

Insulin, as it is extracted by the usual aqueous phosphoric acid-alcohol process, is contaminated with many lipids, carbohydrates, with proteins, as for example glucagon and gastrin, and with proteolytic enzymes.

Isolation and purification of insulin by the crystallization of the alkali metal or ammonium insulin crystal, according to the method of this invention, provides a higher recovery of purer insulin than prior art methods employing iso-electric precipitation or zinc-insulin crystallization. By the process of this invention, a crude insulin preparation containing as little as 2 to 5 International Units (I.U.) of insulin activity per milligram of solids can be purified to yield a material having an activity of about 22–26 I.U. per millgram by a single precipitation-filtration operation.

In a typical application of the process of this invention, the insulin salt cake comprising the solids obtained by salting-out insulin from a neutralized pancreatic extract is employed as the source of insulin. Alternatively, any aqueous acidic solution containing from about 1 to about 100 mg. of insulin per milliter of solution which is substantially free of the divalent ions known to crystallize with insulin can be treated by the process of this invention.

It is obvious that the process of this invention could be carried out with a basic solution of insulin. However, such a procedure is not a method of choice because of the instability of the insulin molecule under basic conditions.

The procedure of this invention, starting with insulin-containing solids or aqueous-acidic solutions containing insulin, is hereinafter described.

If the starting material is a solid, it is dissolved in an aqueous solution at about pH 1.5 to about pH 4.5 so as to provide final concentration from about one to about 100 mg. of solids per milliliter of solution. To the aqueous insulin-containing solution is added about 0.2 M to about 1.0 M aqueous alkali metal hydroxide or ammonium hydroxide until a pH of about 7.2–10.0, preferably about pH 7.8–8.6 is attained. If necessary, a salt of the appropriate cation is added to provide a final cation concentration of about 0.2 M to about 1.0 M, preferably about 0.5 M. During the addition of base, the insulin precipitates as a zwitterion at about the isoelectric point, then redissolves at above about pH 7. The maximum yield of crystalline insulin salt is obtained as the basicity approaches about pH 8.2. The yield is optimal at temperatures at or near ambient room temperatures and decreases at lower temperature. Crystallization is complete at from about ¼ to about 72 hours, depending upon conditions used and the quality and quantity of starting material as hereinafter described. The insulin thus crystallized is removed by decantation or filtration from the aqueous mother liquor.

After separation of the crystalline material, the mother liquor is diluted with about 1/10 volume of alcohol and adjusted to pH 5.2 to effect the iso-electric precipitation of the insulin remaining in the solution. The resulting precipitate is collected and dissolved in acid, and the crystallization process is repeated in order to obtain additional quantities of insulin.

The isolated insulin crystals, representing about 90 percent of the insulin in the original solution, can be redissolved in water and used to prepare zinc insulin or any commercial preparation of insulin without further purification. Such commercial preparations can include PZI (protamine-zinc-insulin), the Lente Insulin group, and, so called, "regular insulin." Alternatively, the crystals can be further purified by any art-recognized purification method prior to zinc-insulin crystallization.

The crystals prepared by the method of this invention possess either 12 or 18 faces and are classified within the isometric class of crystals. Isometric crystals have 3 equal axes perpendicular to one another.

Normally, about 1 cation per molecule of insulin is incorporated into the crystal obtained by the process of this invention. Additional amounts of cation which are found in certain experimental lots appear to arise from the incorporation of sodium chloride into the crystal lattice. This phenomenon is wellknown in the art.

In contrast to the crystals of insulin which include zinc, copper, cadmium, manganese, cobalt, iron, nickel or like multivalent ions, the crystals produced according to the present invention are rapidly water soluble. They are, however, not hygroscopic or deliquescent when in contact with moist air under normal atmospheric conditions. They can be washed with ether or alcohol-ether and air or vacuum dried. In a dried condition, they can be stored in a closed container for an extended period of time with no loss of potency.

The ready solubility of the herein described crystals is advantageous in the preparation of solutions of insulin for further purification by typical manufacturing processes. These further purification processes can include adsorption on ion-exchange resins and elution therefrom, or selective filtration through a molecular sieve. The ready solubility is also advantageous for the preparation of dosage formulations. The insulin prepared by the method of this invention is fully as effective as the zinc-insulin presently available commercially.

Aqueous solutions useful for dissolving crude insulin preparations prior to the crystallization process of this invention can comprise dilute aqueous solutions of inorganic acids, as for example hydrochloric acid, phosphoric acid, sulfuric acid, or the like; organic acids, as for example acetic acid, citric acid, propionic acid, or the like; or mixtures of the above acids having a pH between about pH 1.5 and pH 4.5.

Basification can be accomplished with aqueous solutions of lithium hydroxide, sodium hydroxide, potassium hydroxide, cesium hydroxide, rubidium hydroxide, or ammonium hydroxide at the previously defined concentration.

Salts or aqueous solutions thereof, which can be added to increase the cation concentration in practicing the method of this invention can include soluble organic and inorganic salts consisting of the same cation as used for basification and any appropriate anion. Preferably, the anion will be the anion already contained in the solution, typically as a result of dissolving the insulin salt cake in an aqueous-acid solution. Thus, for example, if the salt cake is dissolved in hydrochloric acid and the sodium insulin crystal is desired, basification can be accomplished by adding an aqueous sodium hydroxide solution and cation concentration can be adjusted by adding sodium chloride or an aqueous solution thereof. If the insulin is dissolved in acetic acid and the potassium insulin crystal is desired, basification can be accomplished by adding an aqueous potassium hydroxide solution and cation concentration can be increased by adding potassium acetate or an aqueous solution thereof.

Preservatives, as for example phenol or methyl p-hydroxybenzoate; sequestering agents, as for example tetrasodium ethylenediamine tetraacetic acid and the like; and small volumes of organic, water miscible solvents do not alter the nature or yield of the product obtained by the method of this invention.

Table 1 demonstrates the effect of pH upon the yield of insulin obtained by the method of this invention. In the table, column 1 shows the pH of the crystallizing solution, column 2 shows the time necessary to effect maximum crystallization of insulin, and column 3 shows the yield of insulin in milligrams of sodium insulin per pound of pancreas extracted. In all examples, the sodium insulin was prepared by the basification of aliquot portions of an aqueous acetic acid solution of pancreatic extract to the indicated pH with aqueous 1 N sodium hydroxide and subsequent storage of the basic solutions at about ambient room temperature for the indicated time prior to isolation of the crystalline product.

TABLE 1

| pH | Time required for maximum crystallization | Yield in mg. per pound of pancreas |
|---|---|---|
| 7.0 | 2 days | 11.3 |
| 7.4 | 1 day | 32.8 |
| 7.8 | 75 minutes | 55.5 |
| 8.2 | 5 minutes | 46.9 |
| 8.6 | 5-10 minutes | 43.7 |
| 9.0 | 1 day | 41.7 |
| 9.4 | 2 days | 32.5 |
| 9.8 | 4-5 days | 46.8 |
| 10.2 | | |

Table 2 demonstrates the results of comparative experiments in which purification of insulin was effected either by using the method of this invention or according to present commercial purification methods comprising isoelectric precipitation and zinc crystallization. Comparative figures were derived from experiments performed on aliquot samples of insulin from the same aqueous-acid solution of pancreas extract. In the table, column 1 identifies the lot number and species of insulin, column 2 shows the yield of insulin as sodium insulin obtained by the method of this invention, and column 3 shows the yield of insulin obtained by the present commercial method.

TABLE 2

| Lot | Species | Yield in mg. per pound of pancreas, new method | Yield in mg. per pound of pancreas, prior art method |
|---|---|---|---|
| 1A | Pork | 45.9 | 48.7 |
| 1B | do | 48.2 | 48.7 |
| 1C | do | 63.1 | 48.7 |
| 2 | do | 71.2 | 48.7 |
| 3 | do | 62.3 | 48.7 |
| 4 | do | 69.3 | 48.7 |
| 5 | Beef | 92.8 | 120 |
| 6 | do | 122 | 120 |

The following examples will further illustrate the method of this invention without limiting the scope thereof.

EXAMPLE 1

The solid material obtained by the extraction of 329 lbs. of pork pancreas and the precipitation of the insulin-containing fraction contained therein, assaying 2.2 I.U. of insulin per mg., was dissolved in 2 N aqueous hydrochloric acid, producing a total volume of 27 liters of solution. The solution was filtered and the residue was discarded. The filtrate was adjusted with 0.1 N aqueous sodium hydroxide solution to pH 5.5, the mixture was separated by centrifugation, and the supernatant was discarded. The residue was dissolved in 695 ml. of 0.5 N aqueous acetic acid to yield a solution having a pH of 3.6 and containing 4.8 percent (w./v.) solids assaying 13.0 I.U. per milligram. Aqueous 1 N sodium hydroxide solution was added to pH 8.2. Crystallization began in about 15 minutes and was complete after the solution was stirred for about 18 hours at about room temperature. The crystals of sodium insulin were isolated by centrifugation. Yield: 51.1 mg. per pound of pancreas extracted. The supernatant was stirred into one-tenth volume of ethanol, acidified to pH 5.2, and chilled overnight. The insulin precipitate which formed was separated by centrifugation and dissolved in 326 ml. of 0.5 N aqueous acetic acid [4.18 percent (w./v.) solids]. Basification to pH 8.2 yielded an additional 11.2 mg. of sodium insulin crystals per pound of pancreas in two lots. Combined yield: 62.3 mg. per pound of pancreas extracted.

EXAMPLES 2-4

The solid material obtained by the extraction of 150 lbs. of pork pancreas and the precipitation of the insulin-containing fraction contained therein, was dissolved in 2 N aqueous hydrochloric acid, producing a total volume of 11.9 liters of solution. The solution contained 10.2 mg. of solids per milliliter. One-tenth volume of ethanol was added and the solution was adjusted to pH 5.2 with 3 N aqueous sodium hydroxide. The resulting precipitate was collected by filtration using diatomaceous earth as a filter aid. The filter cake was extracted with pH 2 aqueous hydrochloric acid, the extract was filtered, and the residue was discarded. The filtrate (165 ml.) was basified to pH 8.2 with 1 N sodium hydroxide (13.0 ml. needed) and 3.63 g. of sodium chloride was added. The total sodium ion concentration was 0.45 M. Crystallization began immediately and was complete in about 18 hours, at which time the crystals were collected by centrifugation, washed twice with absolute alcohol, once with ether, and dried in vacuo. Yield: 44.9 mg. per pound of pancreas extracted. Assay: 24.30±0.40 I.U. per mg.

The above experiment was repeated with varying sodium ion concentrations, adjusted by the addition of varying amounts of solid sodium chloride.

At a 0.55 M sodium ion concentration, the yield was 51.5 mg. per pound of pancreas. Assay: 24.97±0.52 I.U. per mg.

At a 0.65 M sodium ion concentration, the yield was 53.0 milligrams per pound of pancreas. Assay: 23.60±1.00 I.U. per mg.

EXAMPLE 5

The method of Example 2 was followed except that 0.5 N phosphoric acid was used to extract the filter cake obtained from the filtration of the pH 5.2 precipitate. The final sodium ion concentration in the crystallizing solution was 0.46 M. Yield: 48.2 mg. per pound of pancreas. Assay: 22.70 I.U. per mg.

EXAMPLE 6

The method of Example 2 was followed except that 0.5 N sulfuric acid was used to extract the filter cake obtained from the filtration of the pH 5.2 precipitate. The final sodium ion concentration in the crystallizing solution was 0.31 M. Yield: 45.3 mg. per pound of pancreas. Assay: 23.85±0.15 I.U. per mg.

EXAMPLE 7

The method of Example 1 was followed except that 1 N aqueous lithium hydroxide was used to adjust the pH of the acidic solution from the extraction of the pH 5.2 precipitate to pH 8.2. Yield: 12.4 mg. per pound of pancreas. Assay: 21.05 I.U. per mg.

EXAMPLE 8

The method of Example 1 was followed except that 1 N aqueous potassium hydroxide was used to adjust the pH of the acidic solution from the extraction of the pH 5.2 precipitate to pH 8.2. Yield: 12.0 mg. per round of original pancreas. Assay 22.25 I.U. per mg.

EXAMPLE 9

The method of Example 1 was followed except that 1 N aqueous ammonium hydroxide was used to adjust the pH of the acidic solution from the extraction of the pH 5.2 precipitate to pH 8.2. Yield: 40.2 mg. per pound of original pancreas. Assay: 20.15 I.U. per mg.

EXAMPLE 10-12

The methods of Example 1, 8, and 9 were followed except that solids from the extraction of beef pancreas instead of pork pancreas were used. The yield of insulin from the sodium hydroxide basification of the aqueous acetic acid solution obtained by the extraction of the pH 5.2 precipitate was 91.5 mg. per pound of pancreas (22.70±2.40 I.U./mg.).

The yield of insulin from potassium hydroxide basification of the acidic extract was 80.7 mg. per pound of pancreas (23.68±1.39 I.U./mg.).

The yield of insulin from ammonium hydroxide basification of the acidic extract was 49.1 mg. per pound of pancreas (23.68±1.92 I.U./mg.).

EXAMPLE 13

The solid material obtained by the extraction of 20 lbs. of beef pancreas and the precipitation of the insulin-containing fraction contained therein was dissolved in 1.89 liters of 0.5 N aqueous acetic acid to yield a solution having a pH of 3.6 and containing 4.2 percent (w./v.) solids assaying 2.2 I.U. per milligram. Aqueous 1 N sodium hydroxide solution was added to pH 8.2. The solution was stirred for one hour, then 60.0 g. of sodium chloride was added. Crystallization began in about 15 minutes and was complete after the solution was stirred for about 18 hours at about room temperature. The crystals of sodium insulin were isolated by centrifugation. Yield: 44.7 mg. per pound of pancreas extracted. An additional amount of sodium chloride was added to increase the sodium ion concentration of the supernatant to 1.0 M. An additional 11.2 mg. of sodium insulin crystals per pound of pancreas crystallized therefrom. Combined yield: 53.1 mg. per pound of pancreas extracted.

I claim:

1. A method for purifying insulin which comprises treating an aqueous solution free of the divalent ions known to crystallize with insulin and containing pork or beef insulin in an amount from about 1 mg. to about 100 mg./milliliter by adjusting the basicity of the insulin-containing solution to a pH between 7.2 and 10.0 with an alkali metal or ammonium base and by adjusting the cation concentration to a concentration of 0.2 molar to 1.0 molar with a cation selected from the group consisting of an alkali metal cation and the ammonium cation whereby alkali metal insulin or ammonium insulin crystals form.

2. The method of claim 1 wherein the crystallized alkali metal insulin or ammonium insulin is separated from the mother liquor by filtration, decantation, or centrifugation.

3. The method of claim 1 wherein the aqueous solution of pork or beef insulin is an acidic aqueous insulin-containing pancreatic extract.

4. The method of claim 1 wherein the cation is the ammonium cation.

5. The method of claim 1 wherein the alkali metal cation is selected from the group consisting of sodium, potassium, and lithium.

6. The method of claim 5 wherein sodium hydroxide is used to adjust the cation concentration.

7. The method of claim 5 wherein potassium hydroxide is used to adjust the cation concentration.

References Cited

UNITED STATES PATENTS

| | | | |
|---|---|---|---|
| 2,779,706 | 1/1957 | Homan | 260—112.7 |
| 2,787,575 | 4/1957 | Homan et al. | 424—178 |
| 1,626,044 | 4/1927 | Macy | 424—110 |
| 2,353,016 | 7/1944 | Daughenbaugh | 424—110 |
| 2,826,534 | 3/1958 | Kutz | 260—112.7 |
| 2,920,014 | 1/1960 | Petersen et al. | 260—112.7 |

FOREIGN PATENTS

| | | | |
|---|---|---|---|
| 733,740 | 7/1955 | Great Britain | 260—112.7 |

OTHER REFERENCES

Schlichtkrull: Insulin Crystals, Ejnar Munksgaard Publishers, Copenhagen (1958), p. 55. Portion relied upon appears in col. 2, lines 33–40 of specification.

ELBERT L. ROBERTS, Primary Examiner